…

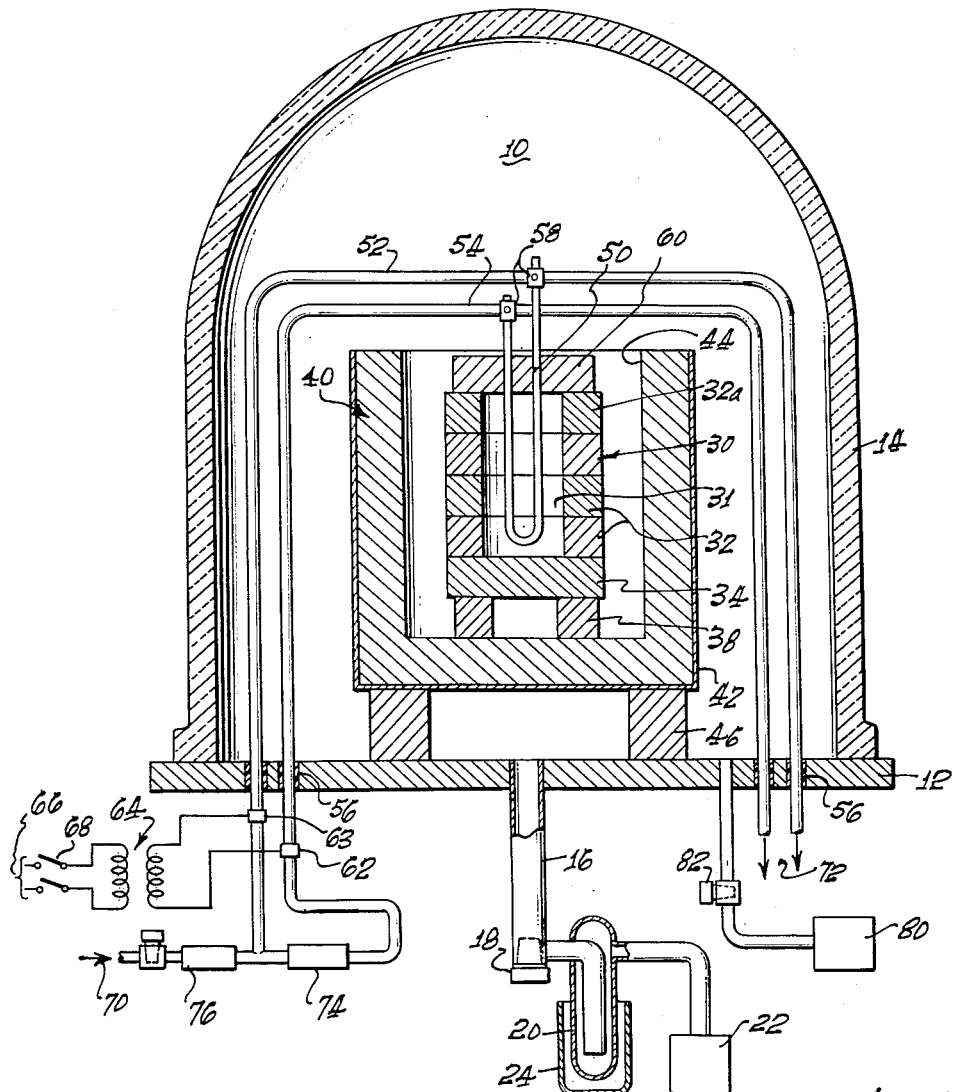

United States Patent Office 2,987,383
Patented June 6, 1961

2,987,383
PURIFICATION OF ELEMENTAL BORON
Joseph Schulein, Corvallis, Oreg., and John Yannacakis, Inglewood, Calif., assignors to United States Borax & Chemical Corporation, Los Angeles, Calif., a corporation of Nevada
Filed Dec. 2, 1957, Ser. No. 699,977
7 Claims. (Cl. 23—295)

This invention has to do with methods and means for removing impurities from elemental boron.

Several methods are known by which elemental boron may be produced having a purity of 90 to about 96 percent. The detailed nature of the impurities which comprise the remainder of such products depends upon the production method employed. Such impurities may, for example, include appreciable amounts of oxygen, nitrogen and carbon, which are believed ordinarily to be chemically combined with boron to form oxides, nitrides and carbides of boron. Magnesium is also typically present as an impurity in elemental boron produced by reaction of magnesium metal and boric acid or boron trioxide, which reaction is commonly known as the Moissan process. It is difficult to remove small concentrations of such impurities, and many efforts to do so have only led to further contamination of the boron.

One method that has been proposed for removing such impurities is to heat the elemental boron in vacuum. Due to the relatively low vapor pressure of boron at very high temperatures, the impurities tend to be selectively vaporized and to be removable by pumping or by condensation on the walls of the vacuum chamber. However, attempts to utilize previously reported methods have resulted only in boron of unsatisfactory purity. That appears to have been due in part to insufficiently high temperature or to contamination of the treated boron by impurities released by the source of heat or by adjacent surrounding structures.

The present invention has successfully overcome those difficulties and has provided means and methods for the regular and relatively economical production of elemental boron of better than 99 percent purity.

This is accomplished by taking full advantage for the first time of an important physical property of amorphous and impure crystalline elemental boron, namely its low heat conductivity. In accordance with one aspect of the invention, the amorphous or crystalline elemental boron to be purified is substantially or completely surrounded by a heat shield which is itself formed of additional elemental boron. In typical form of the invention, such elemental boron is formed into a body having a cavity, and is heated by a suitable source of radiant heat within the cavity. In that way the boron adjacent the inner surface of the body can actually be heated to fusion temperature, while the outer wall of the body remains relatively cool due to the low rate at which heat is conducted through the intervening wall of elemental boron.

By utilizing the described heating procedure it has been found possible to maintain the inner portion of the boron substantially at fusion temperature, that is from about 2100 to about 2300° C., for several hours at a time. A portion of the heated boron may actually be melted and form a pool at the bottom of the cavity. A substantial increase in purity of the treated boron is attained by such heating, substantially to fusion temperatures, as compared to previous processes in which lower temperatures were necessarily employed.

The effectiveness of elemental boron as a heat shield is greatly improved by suitable preparation of the bodies that are utilized for that purpose. As will be described more fully, such bodies are best prepared from finely powdered elemental boron by compacting the powder, by pressure or otherwise, just sufficiently to permit convenient handling. The resulting body typically has a low bulk density, is highly permeable to gases, and has remarkably high thermal insulating power. When the boron under treatment is directly surrounded by that special form of elemental boron, the high insulating ability of the latter is fully utilized without preventing effective vaporization and removal of the impurities.

A further reason for the improved purity of boron produced by the invention is believed to be that contamination of the boron by contaminants emitted from surrounding objects is greatly reduced. In previous processes, foreign objects adjacent the boron could not be prevented from reaching elevated temperatures, at which they vaporized significant amounts of potential contaminants. Elemental boron at elevated temperatures reacts readily with many such contaminants. An important aspect of the present invention is the fact that, with the single exception of the source of radiant energy, all objects in the neighborhood of the boron during its purification either are substantially at normal temperature, or are themselves composed primarily of elemental boron, and thus cannot contribute foreign contaminants. By maintaining surrounding foreign objects at relatively low temperatures, compared to the boron being treated, the vapor pressure of released potential contaminants is greatly reduced. At the same time, the cooler surroundings promote the condensation and vacuum removal of the initial contaminants that are vaporized from the hot elemental boron. Thus, the invention both aids removal of contaminants initially present in the boron and excludes other contaminants that might react at high temperature with the boron.

The shielding action of surrounding elemental boron can be greatly increased by forming an outer portion of the shielding material as a separate body, spaced from the inner portion. When that is done, the maximum temperature reached by the outer portion is typically very appreciably lower than that of even the outer surface of the inner body. It is then feasible to utilize for the outer portion of the shield elemental boron of only moderate purity.

One particularly effective source of radiant energy for carrying out the invention comprises a resistance element of tungsten rod or wire and of narrow elongated U-shape. Tungsten has the great advantage that it contributes substantially no contamination to the boron. Rods made of borides such, for example, as zirconium boride, also offer that advantage, but are quite brittle and hence not convenient to handle.

A more economical type of heating element comprises a rod of carbon, for example in the form of graphite. However, in spite of the very low vapor pressure of carbon, we have discovered that there is danger that the boron will be contaminated by carbon carried over from the radiation source. That contamination of the boron with carbon is believed to result in part from the opposite action, contamination of the carbon by vaporized boron, which may change the phase characteristics of the carbon. In accordance with a further aspect of the invention, we have found that such vaporization of both the carbon and the boron, and hence their tendency toward mutual contamination, can be greatly reduced by introducing a stable or inert gas. By maintaining the pressure of such gas between about one and about ten centimeters of mercury, we have found that carbon contamination can be substantially eliminated, while still permitting proper removal of impurities emitted from the hot boron.

A further important aspect of the invention is the utilization of the described procedure for producing crystalline elemental boron of high purity. When amorphous boron is heated in the described manner substantially to fusion temperature with exclusion of foreign contamination, the resulting purified product is found to be substantially crystalline in nature.

A full understanding of the invention and of its further objects and advantages will be had from the following description of an illustrative manner of carrying it out. Neither that description nor any particulars of the accompanying drawing, which forms a part of it, is intended as a limitation upon the scope of the invention, which is defined in the appended claims.

The single drawing is a vertical axial section of an illustrative apparatus for removing impurities from elemental boron in accordance with the invention.

A vacuum chamber is indicated at 10, formed by an enclosure which comprises a flat metal base plate 12 and a bell jar 14 which may be of glass or steel, for example. Chamber 10 may be evacuated by any suitable means, shown as the tube 16 which communicates with a bore in plate 12, the control valve 18, the conventional trap structure 20 and the vacuum pump indicated schematically at 22. Trap 20 may be surrounded by a suitable coolant fluid, such as liquid air, for example, in a container indicated at 24.

The solid elemental boron to be purified, which may be of either amorphous or crystalline character, or a mixture thereof, is arranged as a body indicated generally by the numeral 30 and typically comprising a plurality of annular rings 32 which may be of identical form and size, and a base disk 34. Those boron members are typically formed by pressing finely divided amorphous elemental boron in suitable dies under sufficient pressure to cause the boron powder to coalesce just sufficiently to permit convenient handling of the resulting body. A pressure of about 20,000 pounds per square inch has been found suitable for that purpose. The wall thickness of the rings 32 is typically at least about 1 inch. Rings 32 and base disk 34 are stacked as indicated, to form a boron body 30 of hollow cylindrical form with its lower end closed. That body is mounted as on blocks 38, preferably boron, within a shield body now to be described.

A typical shield structure in accordance with the invention is indicated generally by the numeral 40, and comprises a molded body of elemental boron of hollow cylindrical form with one end closed. That body may be enclosed within an outer mold 42, typically of sheet metal, such as steel or copper, for example. The body 40 may conveniently be formed by first preparing an aqueous slurry of finely divided elemental boron, employing only enough water to make a stiff paste. That paste is then introduced between an outer mold, such as the container indicated at 42, and an inner mold, typically of the shape of the inner face 44 of body 40 as shown. After the paste has partially set, the inner mold may be removed. The molded body 40, still supported externally by outer mold 42, is then preferably dried slowly, as in an oven at a temperature of about 60° C. for several days. The molded shield is then preferably baked in vacuum at a temperature of approximately 1000° C. for one or two hours to remove further traces of water. It has been found generally satisfactory to retain outer mold 42, but the boron body resulting from the described treatment has sufficient strength to permit removal of that outer mold if preferred.

Boron shield body 40 is preferably supported within vacuum chamber 10 in spaced relation above base plate 12. Blocks 46 of molded or pressed boron may be utilized for that purpose. Supporting blocks 38 are then placed within the shield body on its flat end surface, and the boron elements 32 and 34 are assembled in position as illustratively shown to form inner boron body 30. That body is spaced from shield 40 at all points except the supporting blocks 38.

A suitable resistance element is suspended in spaced relation within the cavity 31 of boron body 30, as illustratively indicated at 50. That resistance element may comprise tungsten wire or rod, typically of about 1/8 to 1/4 inch diameter bent to hairpin form, and having the two legs supported by suitable electrical leads. For example, copper tubes 52 and 54 of general U-shape may be mounted in insulating bushings 56 in base plate 12 with the central portion of the U passing directly above boron body 30. The two legs of the resistance element may then be connected by electrically conductive bracket structures 58 to the respective tubes. The open upper end of boron body 30 is preferably substantially closed, as by placing blocks 60 of elemental boron on top of the upper ring 32a.

Electrical connections may be made to the respective tubes at 62 and 63 from the secondary of a step-down transformer indicated schematically at 64. Transformer 64 may be of the variable voltage type. As shown, the primary winding of the transformer is supplied with alternating current power from a suitable source indicated at 66 via a control switch 68. The conductive tubes 52 and 54 are preferably cooled by circulating a suitable fluid, such as water, through them. As shown, the water enters both tubes from a source 70, and leaves the tubes at 72. The tubes are electrically insulated from each other and from the water source by short insulative sections indicated at 74 and 76.

After assembly of the described apparatus, chamber 10 is evacuated via pump 22 and current is supplied to resistance element 50 by closing switch 68. The amount of power required to produce any desired temperature of the inner wall of boron body 30 depends upon details of the structure, particularly its size. For a boron body 30 having an outer diameter of about 4 inches and an inner diameter of about 2 inches, satisfactory results are typically obtained with a power consumption in resistance element 50 from about 5 to about 10 kilowatts. After about 2 hours of operation the temperature of the inner boron body reaches substantial equilibrium, with its inner wall preferably at a temperature of approximately 2000 to 2200° C., which is substantially the fusing temperature of elemental boron. That temperature range is preferably maintained for a further treatment period of one to three hours, with continuous evacuation of chamber 10. Switch 68 is then opened and the apparatus allowed to return substantially to room temperature before admission of air. Cooling may be accelerated if desired by admitting to chamber 10 an inert gas, such, for example, as helium, from a suitable supply 80 via valve 82.

After the described treatment, the inner portion of boron body 30 is typically coalesced by fusion of the elemental boron into a unitary ingot body. Any unsintered outer portions of body 30 are removed mechanically, and the ingot portion may then be ground to any desired mesh size. The resulting granular product is found to be largely crystalline in character, and to consist typically of elemental boron of better than about 99 percent purity. The purified boron adjacent the inner wall of the ingot is substantially all crystalline in nature. When a portion of the boron is caused to melt and form a molten pool at the bottom of the cavity 31, the melt after cooling and solidification is substantially wholly crystalline and typically contains single crystals having dimensions up to several millimeters.

When electrical resistance element 50 is replaced by a carbon resistance element, the operating procedure may be like that already described, except that, after preliminary heating and degassing of the apparatus and the charge of elemental boron, an atmosphere of inert gas is supplied to the vacuum enclosure, as via valve 82. The pressure of that atmosphere may be measured by conventional means, not shown, and should be maintained between about one and about ten centimeters of mercury. It is preferred to maintain a continuous flow of the gas through the chamber to aid removal of impurities vaporized frm the hot boron.

We claim:
1. The method of removing impurities from elemental boron, said method comprising forming a body of elemental boron, said body substantially enclosing a cavity and having an inner surface, arranging an electrical resistance element within the cavity of said body, surrounding said body by an evacuable enclosure, removing atmospheric gases from the enclosure, and supplying radiant heat to the inner surface of the body by means of said resistance element, in quantity sufficient to heat the elemental boron adjacent the inner surface approximately to fusing temperature.

2. The method of removing impurities from elemental boron, said method comprising forming a first body of elemental boron, said body partially enclosing a cavity and having an inner surface and an outer surface, arranging an electrical resistance element within the cavity of said first body, forming a second body of elemental boron which at least partially surrounds the first body in spaced opposed relation to the outer surface thereof, surrounding said bodies in an evacuable enclosure, removing atmospheric gases from the interior of the enclosure, and supplying radiant heat to the inner surface of said first body, by means of said resistance element, in quantity sufficient to heat the elemental boron adjacent that inner surface approximately to fusing temperature.

3. The method of removing impurities from elemental boron, said method comprising providing a tungsten resistance element, arranging elemental boron in the form of a wall which substantially surrounds the resistance element in spaced relation thereto, surrounding the elemental boron and the resistance element in an evacuable enclosure, evacuating said enclosure, and electrically heating the resistance element to a temperature sufficient to substantially fuse the elemental boron adjacent the inner surface of said wall.

4. The method of removing impurities from elemental boron, said method comprising providing a carbon resistance element, arranging elemental boron in the form of a wall which substantially surrounds the resistance element in spaced relation thereto, surrounding the elemental boron and the resistance element in an evacuable enclosure, evacuating said enclosure, providing within the enclosure an inert gas at a pressure between about one and about ten centimeters of mercury, and electrically heating the resistance element to a temperature sufficient to heat the elemental boron adjacent the inner surface of said wall approximately to fusing temperature.

5. The method of converting substantially amorphous elemental boron into substantially crystalline elemental boron, said method comprising forming a body of substantially amorphous elemental boron, said body substantially enclosing a cavity and having an inner surface, arranging an electrical resistance element within the cavity of said body, surrounding said body by an evacuable enclosure, removing atmospheric gases from the enclosure, supplying radiant heat to the inner surface of the body, by means of said resistance element, in quantity sufficient to substantially fuse elemental boron adjacent that inner surface, and cooling the fused boron to form crystals therein.

6. The method of converting substantially amorphous elemental boron into substantially crystalline elemental boron, said method comprising forming a first body of substantially amorphous elemental boron, said body substantially enclosing a cavity and having an inner surface, and an outer surface, arranging an electrical resistance element within the cavity of said first body, forming a second body of elemental boron which at least partially surrounds the first said body in spacedly opposed relation to the outer surface thereof, surrounding said bodies with an evacuable enclosure, removing atmospheric gases from the interior of the enclosure, supplying radiant heat to the inner surface of the first said body, by means of said resistance element in quantity sufficient to substantially fuse elemental boron adjacent that inner surface, and cooling the fused boron to form crystals therein.

7. The method of converting substantially amorphous elemental boron into substantially crystalline elemental boron, said method comprising forming a first body of substantially amorphous elemental boron, said body substantially enclosing a cavity and having an inner surface, and an outer surface, arranging an electrical resistance element within the cavity of said first body, forming a second body of elemental boron which at least partially surrounds the first said body in spacedly opposed relation to the outer surface thereof, surrounding said bodies with an evacuable enclosure, removing atmospheric gases from the interior of the enclosure, supplying radiant heat to the inner surface of the first said body, by means of said resistance element in quantity sufficient to fuse elemental boron adjacent that inner surface and to form a pool of molten elemental boron at the bottom of said cavity, and cooling the fused boron to form crystals therein.

References Cited in the file of this patent

UNITED STATES PATENTS

| 937,120 | Tone | Oct. 19, 1909 |
| 2,402,582 | Scaff | June 25, 1946 |

OTHER REFERENCES

Sproull: Rev. Scient. Inst., vol. 22, pages 410–414 (1951).

Lely: Ber. Deut. Keram. Gesell., vol. 32, pp. 229–231 (1955).

Emeis: German application klass 40d, Gruppe 130, S38055 VI/40d, June 14, 1956.